United States Patent
Hulbert

(10) Patent No.: US 8,094,572 B2
(45) Date of Patent: Jan. 10, 2012

(54) COMMUNICATIONS METHOD AND APPARATUS

(75) Inventor: Anthony Peter Hulbert, Hampshire (GB)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 960 days.

(21) Appl. No.: 11/666,075

(22) PCT Filed: Oct. 21, 2005

(86) PCT No.: PCT/GB2005/004063
§ 371 (c)(1), (2), (4) Date: Feb. 29, 2008

(87) PCT Pub. No.: WO2006/043076
PCT Pub. Date: Apr. 27, 2006

(65) Prior Publication Data
US 2008/0253297 A1   Oct. 16, 2008

(30) Foreign Application Priority Data
Oct. 22, 2004   (GB) ................. 0423503.2

(51) Int. Cl.
  *H04L 12/26* (2006.01)

(52) U.S. Cl. ........ 370/252; 370/318; 370/321; 370/324; 370/347

(58) Field of Classification Search ............ 370/318, 370/321, 324, 347; 455/126, 446, 562.1, 455/575.7
See application file for complete search history.

(56) References Cited

U.S. PATENT DOCUMENTS

| | | | |
|---|---|---|---|
| 5,524,285 A * | 6/1996 | Wray et al. | 455/126 |
| 5,724,666 A * | 3/1998 | Dent | 455/562.1 |
| 6,377,558 B1 * | 4/2002 | Dent | 370/321 |
| 6,829,226 B1 * | 12/2004 | Apostolides et al. | 370/318 |
| 2003/0060205 A1 * | 3/2003 | Shapira | 455/446 |
| 2004/0037263 A1 * | 2/2004 | Zeira | 370/347 |
| 2004/0114552 A1 * | 6/2004 | Lim et al. | 370/324 |
| 2005/0202859 A1 * | 9/2005 | Johnson et al. | 455/575.7 |

FOREIGN PATENT DOCUMENTS
GB   2 332 122   6/1999

OTHER PUBLICATIONS

3GPP TS 05.08 V8.11.0 (Aug. 2001), 3rd Generation Partnership Project; Technical Specification Group GSM/Edge Radio Access Network; Radio subsystem link control Release (1999), pp. 11, 27-40, 80-87.*

British Search Report, dated Mar. 11, 2005 and issued in corresponding British Patent Application No. GB042503.2.

* cited by examiner

*Primary Examiner* — Jason Mattis
*Assistant Examiner* — Joseph Bednash
(74) *Attorney, Agent, or Firm* — Staas & Halsey LLP

(57) ABSTRACT

A method of maintaining a communication link between a network node and a mobile node of a communications network comprises providing at least two downlink transmission beams (A to D) and designating a first of the at least two beams as a primary transmission beam (e.g. B). The beams are used in accordance with a schedule. Received signal quality or signal strength measurements are taken at the mobile node and signaled to the network node. A quality of link on the primary transmission beam (e.g. B) and at least one other of the at least two transmission beams (e.g. A, C) is determined from the measurements signaled from the mobile node to the network node and the quality of link for the beams is compared to provide a comparison and the schedule varied in accordance with the comparison.

29 Claims, 8 Drawing Sheets

COMMUNICATIONS METHOD AND APPARATUS

This invention relates to a method of maintaining a communications link between a network node and a mobile node of a communications network and apparatus, therefore the invention is particularly applicable to cellular networks, such as GSM or W-CDMA.

In cellular networks, base stations are used to link mobile stations to a communications network. The cells are arranged to allow for re-use of transmission frequencies over the area covered by the network. Typically, the cells are subdivided into sectors by a sector antenna. The widespread popularity of mobile telephony, in particular, has led to pressure to increase spectral efficiency even further. One technique is to further subdivide the sectors served by a base station by the use of switched beam antennas each of which serves a subdivision of the sector. The mobile station obtains its connection to the network by the beam offering the best performance. Determining the beam having the best performance is relatively straightforward on the uplink (transmissions from mobile to base station), but rather more difficult on the downlink (transmissions from base station to mobile).

One proposed solution is to use the same beam for downlink as used in the uplink. Unfortunately, this may not always be the appropriate beam due to multipath propagation and other factors.

In accordance with a first aspect of the present invention a method of maintaining a communications link between a network node and a mobile node of a communications network comprises providing at least two downlink transmission beams; designating a first of the at least two beams as a primary transmission beam; using the beams in accordance with a schedule; taking received signal quality or signal strength measurements at the mobile node; signaling the measurements to the network node; determining a quality of link on the primary transmission beam and at least one other of the at least two transmission beams from measurements signaled from the mobile node to the network node; comparing the quality of link for the beams to provide a comparison and varying the schedule in accordance with the comparison; wherein the network node is operable in a full mode and a discontinuous mode; and wherein the beams are switched during slots allocated for measuring quality parameters during these transmission modes. The present invention enables the choice of the most appropriate beam for the communications link in order to alleviate the problems of the prior art.

In a communications network a base transceiver station transmits on a downlink by utilising a number of transmission beams. The usage of the beams is varied to favour the one offering the best quality to maintain the communications link based on measurements performed at the mobile station and signaled back to the base station using the existing protocols. The quality of the beams is monitored and compared, and a usage schedule derived. The beams are then used in a number of slots as defined by the schedule.

In the preferred embodiment the network node is a base transceiver station operating in accordance with a time division multiple access (TDMA) protocol and the network is a cellular communications network. The beams are then used to transmit during slots to the mobile node and the number of slots allocated to each beam varied according to the schedule. Thus, a primary beam is that predominantly used in the schedule. That is to say the communications link is maintained over the primary beam for the most part. The quality of the other beams is monitored and as a variation in the quality is detected the schedule is varied.

Preferably, the comparison comprises comparing a current quality of a link on a beam with a former quality of the link on that beam.

Preferably, the comparison comprises comparing the quality of a link on a first beam (e.g. B) and the quality of a link on a second beam (e.g. C) or on an intermix between the first beam (B) and said second beam (C).

Preferably, a beam is designated as the primary beam as a result of the comparison which primary beam has a greater scheduled use.

Preferably, when the comparison result indicates a higher quality link on a beam that beam is made the primary beam.

Preferably, the former primary beam is made a secondary beam. Preferably, the schedule is varied to increase the use of a beam in the case of the comparison indicating an increase in the quality of the link on that beam. Preferably, the quality of a beam is determined at the network node based on a signal or signals received from the mobile node, wherein the signal or signals relate to a transmission on a first beam received by the mobile station during a first transmission channel and to a transmission on a second beam, or an intermix of the first and second beams, received by the mobile node on a second channel.

Preferably, the channels are configured in a communications frame in a GSM communication system including a slow associated control channel (SACCH).

Preferably, the schedule of use includes a switch in the polarisation of at least one of the beams. Preferably, the schedule of use switches beams during at least one of a first and a second set of slots allocated for the derivation of RXQUAL_SUB/RXLEV_SUB and RXQUAL_FULL/RXLEV_FULL.

Alternatively, the schedule of use switches beams in the set of slots allocated for the derivation of RXQUAL_SUB/RXLEV_SUB.

Preferably, the first transmission beam is utilised for substantially all of the slots allocated to the derivation of RXQUAL_FULL/RXLEV_FULL.

Preferably, the second transmission beam is utilised for a proportion up to all of the slots allocated for the derivation of RXQUAL_SUB/RXLEV_SUB and not utilised for any of the slots allocated for the derivation of RXQUAL_FULL/RXLEV_FULL.

Preferably, the schedule is varied by varying the number of respective slots allocated to the respective transmission beams.

Preferably, the schedule of use of slots allocated for the derivation of RXQUAL_SUB/RXLEV_SUB by the transmission beams is varied incrementally.

Preferably, when previous measurements indicate that the correct usage of beams is borderline between two adjacent beams, the switching between beams during a SACCH frame is performed during time division multiple access (TDMA) frames allocated for the derivation of RXQUAL_FULL/RXLEV_FULL measurements and the fixed primary beams is used during TDMA frames allocated for the derivation RXQUAL_SUB/RXLEV_SUB measurements.

For use in a 3G system, preferably signal strength measurements are signaled using transmit power control bits and mean transmitted power over multiple frames is determined by the network node to determine the primary transmitted beam.

In accordance with a second aspect of the present invention, apparatus for maintaining a communications link between a network node and a mobile node of a communications network comprises a beam controller to provide at least two downlink transmission beams; a designator to designate a first of the at least two beams as a primary transmission beam; a scheduler to provide a schedule for the use of the beams; a receiver in the mobile node to measure received signal quality or signal strength and to signal the measurements to the network node; a quality determinator to determine a quality of the primary beam and at least one other of the at least two transmission beams from the measurements signaled from the mobile node to the network node; and a comparator to compare the quality of the link for the beams to provide a comparison result; wherein the scheduler is responsive to the comparison to vary the schedule; and wherein the beam is switched during slots allocated for measuring quality parameters during full or discontinuous mode transmission modes.

Preferably, the comparator compares a current quality of a link on a beam with a former quality of the link on that beam.

Alternatively, the comparator compares the quality of the link on a first and a second beam.

Preferably, the designator is responsive to the comparator to designate the beam having the highest quality as the primary beam.

Preferably, the designator is responsive to the comparator to designate the beam formerly having the highest quality as the secondary beam.

Preferably, a base station transceiver transmits using a first beam during the time slots from the set of TDMA frames allocated for the derivation of RXQUAL_FULL/RXLEV_FULL and wherein during the time slots from the set of TDMA frames allocated for the derivation of RXQUAL_SUB/RXLEV_SUB the base station transceiver transmits during a proportion of those TDMA frames using the first beam and a complementary proportion of those TDMA frames using a second beam wherein the proportion may vary from zero to one hundred percent.

Preferably, when previous measurements indicate that the correct usage of beams is borderline between two adjacent beams, a base station transceiver switches between beams during a SACCH frame performed during the TDMA frames allocated for the derivation of RXQUAL_FULL/RXLEV_FULL measurements and the fixed primary beams is used during the TDMA frames allocated for the derivation RXQUAL_SUB/RXLEV_SUB measurements.

The invention is applicable to a number of network types, but preferably, the communications network comprises one of GSM and 3G.

In accordance with a third aspect of the present invention, a base transceiver station comprises apparatus according to the second aspect.

A specific embodiment of the invention will now be described with reference to the drawings in which.

Figure 1:
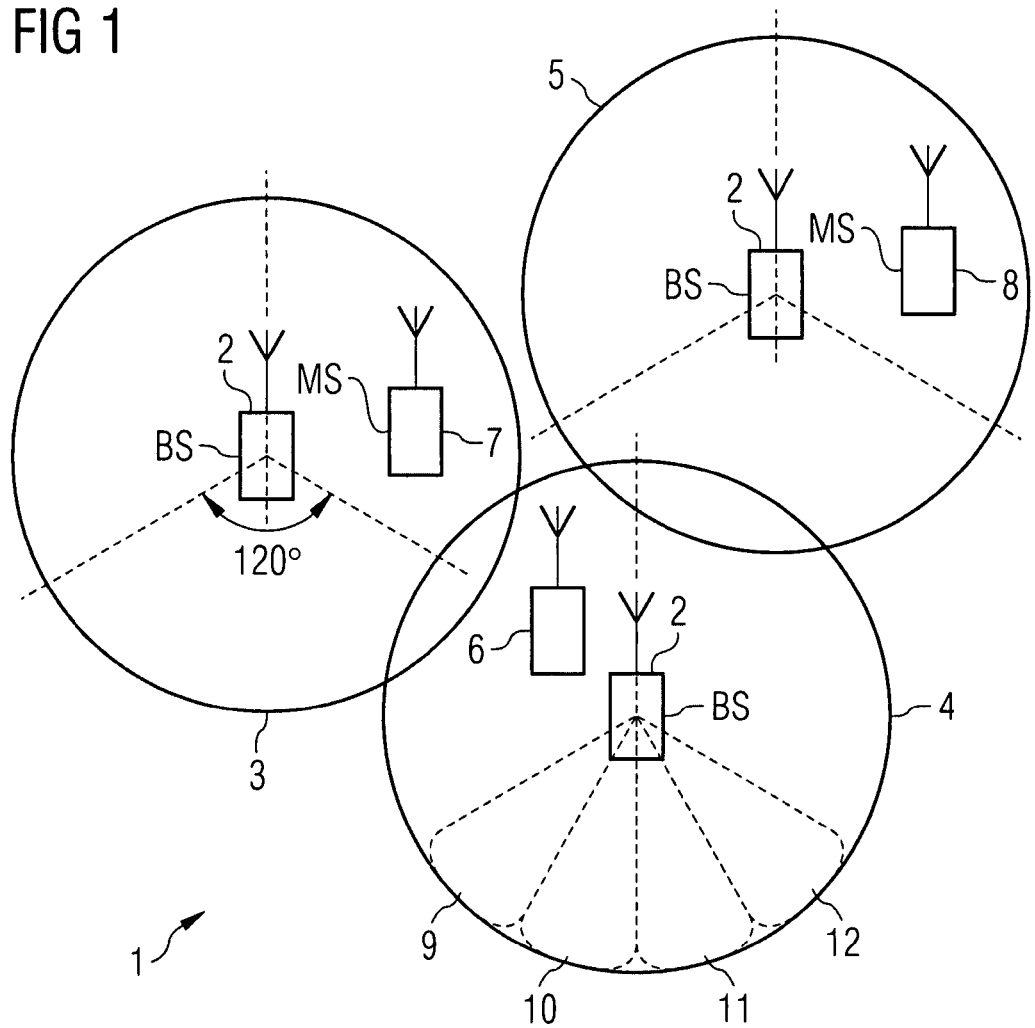
FIG. 1 shows a communications network of base transceiver stations (BTS) and mobile stations (MS)

As is shown in FIG. 1, a communications network 1 in accordance with the present invention comprises a number of base transceiver stations (BTS) 2 serving cells 3, 4 and 5. The cells are depicted as generally circular representing idealised coverage. In reality the cells will be more complex shapes due to propagation effects caused by topography and buildings. Mobile stations (MS) 6, 7 and 8 within the cells 3, 4, 5 connect to the BTS serving that cell. The antenna of each BTS is a switched beam antenna to serve three sectors of the circle each of an angle of 120 degrees. Each sector is formed by a number of beams, four of which are shown 9, 10, 11 and 12. Beams can be configured on both the uplink and the downlink. The downlink will be described.

Figure 2:
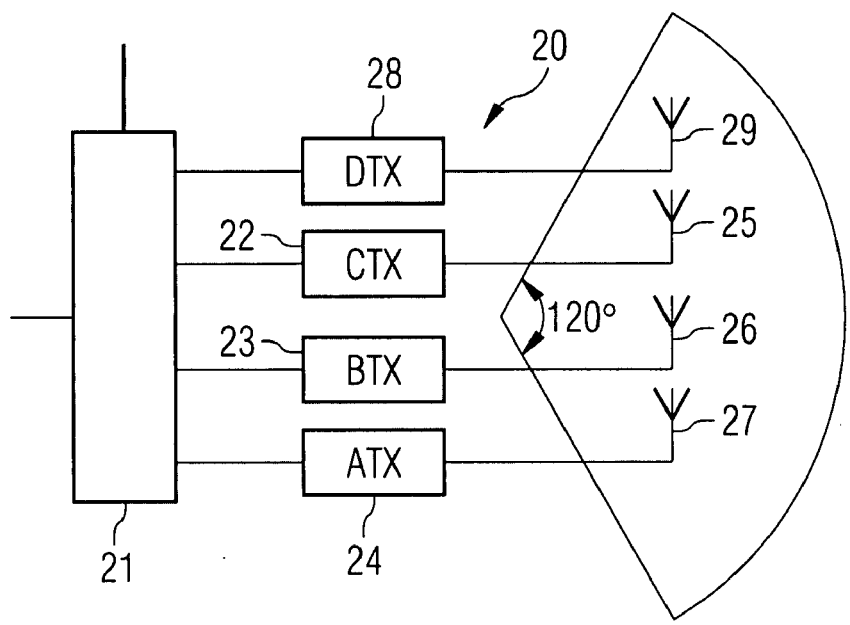
FIG. 2 shows a transmitter beam forming section of apparatus in accordance with the invention.

FIG. 2 shows the transmitter section 20 of one of the base transceiver stations. It comprises a beam controller 21 connected to four beam transmitter sections 22, 23, 24 and 28. The beam transmitter sections 22, 23, 24 and 28 are coupled to respective antennas 25, 26, 27 and 29. The antennas 25, 26, 27 and 29 are shown as discrete antennas although they may be formed as parts of the same antenna array and driven using beam-forming techniques such as a Butler matrix of dipole elements, or collinear dipole elements.

Figure 3:
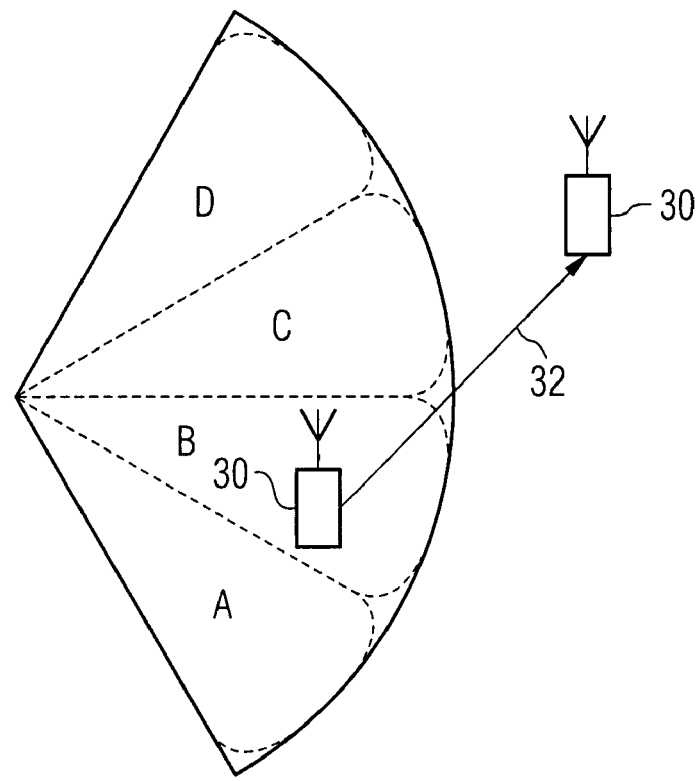
FIG. 3 shows downlink beams forming a sector of a cell served by a base transceiver station.

FIG. 3 shows the four beams formed by the antennas 25, 26, 27 and 29 in broken outline. The beams A, B, C and D form the sector coverage and the edges of the beams overlap. It will be seen that as the mobile station 30 moves in the direction of arrow 32 it crosses the beams A, B, C and D. It will be appreciated that as it does so, the most appropriate beam to use for the downlink will change. Initially, the most appropriate beam is A, then B, then C and finally D before the mobile station 30 moves to another cell in a handover process. It will also be appreciated that the direction of motion and the speed of movement of the mobile station will usually be more complex than depicted. The object of the invention is to provide a method for maintaining the communication link with the best antenna on the downlink.

Global system for mobile communications (GSM) operates a time division multiple access (TDMA) scheme with TDMA frames consisting of eight time slots, wherein a time slot is assigned to each mobile for communications. TDMA frames are grouped into blocks of 104 frames known as slow associated control channel (SACCH) frames. Within the SACCH frame, four frames are reserved to provide the mobile station with time slots for transmitting signaling information back to the base transceiver station. These four frames comprise the SACCH itself. Included in this signaling information are two indicators relating to the received signal at the mobile station. One provides a measure of the received signal level (RXLEV) and the other provides a measure of the received signal quality (RXQUAL) as reflected in bit error rates as specified in the specification 3GPP TS 05.08: of the $3^{rd}$ Generation Partnership Project; Technical Specification Group GSM/enhanced data rates for GSM evolution (EDGE) Radio Access Network (GERAN); Radio subsystem link control, section 8. These signal indicators relate to the average of the received signal over the previous SACCH frame. The period of a SACCH frame is 480 ms. Since this is the maximum rate at which signaling of received signal quality can be passed from the mobile station to the base transceiver station, this is also the maximum rate at which the base transceiver station can usefully alter the proportion of frames being transmitted from different beams. Thus, in the present invention, in any given SACCH frame, the base transceiver station will either transmit using one beam in all the TDMA frames of that SACCH frame or will transmit using one beam in some of the TDMA frames of that SACCH frame and a different beam in others of the TDMA frames of that same SACCH frame. In the second of these two cases, one of the two beams used will be the same as the single beam used in the first of these two cases.

By comparing the RXLEV for SACCH frames in which only one beam has been used, with the RXLEV for SACCH frames in which two beams have been used, it can be observed whether including the use of the additional beam within the SACCH frame increases or decreases the received signal level.

Assuming that the mobile station 30 is within beam B, this beam is used in all the TDMA frames and in a significant proportion of the SACCH frames. However, in some of the SACCH_frames, the base station transceiver transmits in its time slot in some of the TDMA frames using either, but not both, of beams A and C.

If the measured signal quality improves when the C beam is included, then the proportion of TDMA frames, in which time slots are used by the C beam within a SACCH frame when more than one beam is being used within the SACCH frame, is increased. This usage of the beams may continue for some time with B being the primary beam and C being the secondary beam. The quality of the beams is compared and in the event of the C beam having a greater quality than the B beam, the C beam is made the primary beam and the B the secondary.

The beams may be used for particular SACCH frames in the following manner:
1. Transmit beam 'B' (the primary beam) ONLY for one SACCH frame (104 TDMA frames);
2. Transmit beam 'B' and a small proportion of beam 'A' (mixed primary and secondary Beams) for one SACCH frame;
3. Transmit beam 'B' and a small proportion of beam 'C' (mixed primary and other secondary beams) for one SACCH frame;
4. Transmit beam 'B' (the primary beam) ONLY for one SACCH frame again and then repeat this cycle.

Alternatively, the method may always transmit a reference (the primary beam only) SACCH frame in between every mixed SACCH frame in which case the period of measurement for every condition would be 4 SACCH frames—i.e. nearly 2 seconds based on current performance.

Figure 4:
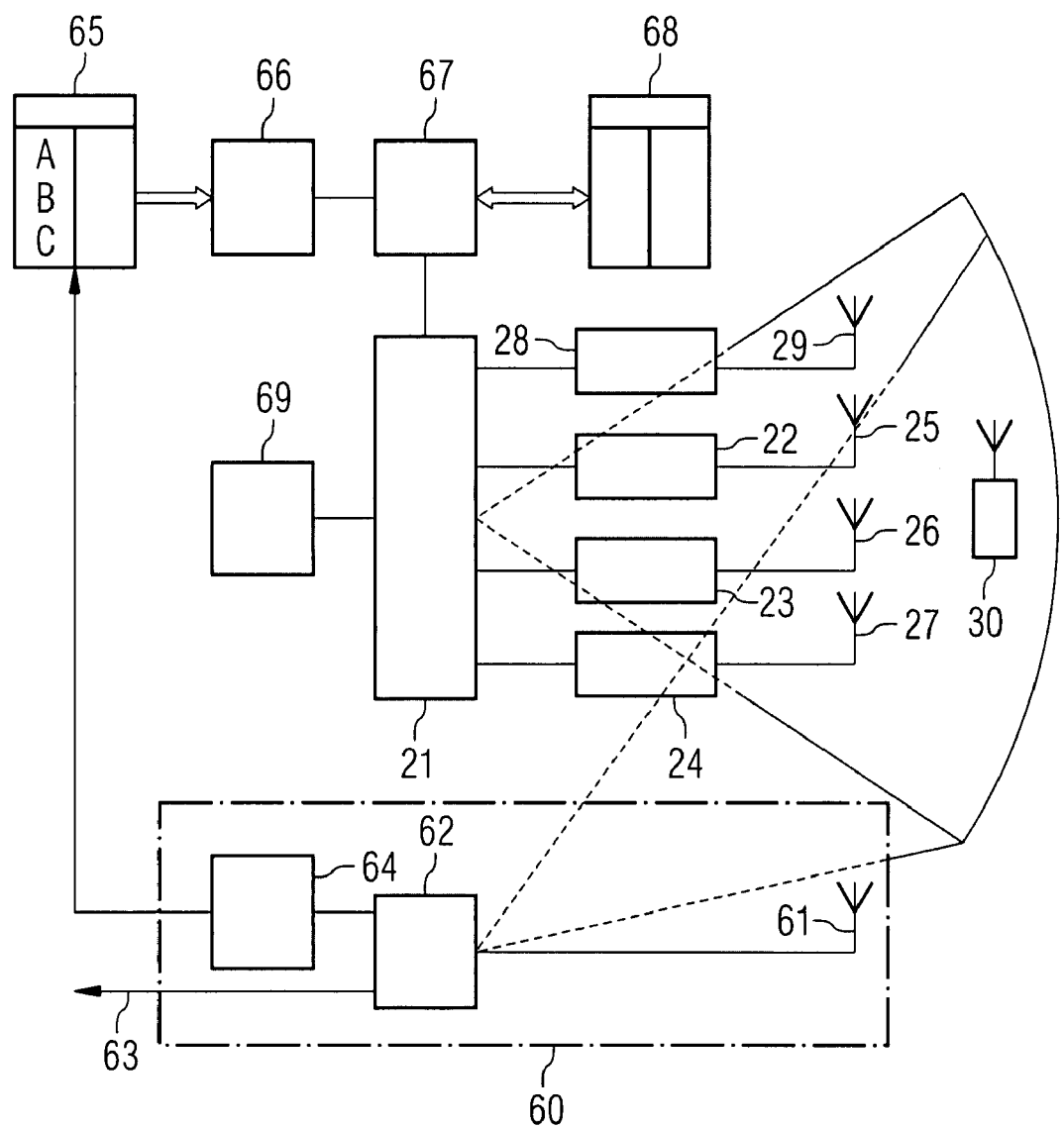
FIG. 4 shows apparatus in accordance with aspects of the invention.

Having described the method in broad terms, further explanation will now be given with reference to a more detailed figure of a base transceiver station in accordance with the invention. In FIG. 4, a sector is served by transmission beams produced by the antennas 25 to 27 and 29. The mobile 30 lies within the sector. FIG. 4 also includes a depiction of a receiver section 60 which receives signals transmitted by the mobile 30. The receiver section 60 includes an antenna 61 coupled to a decoder 62. The decoder decodes the signals received from mobile station 30 and passes these to the rest of the base transceiver station, along line 63 and to a quality determinator 64. The quality determinator 64 processes the incoming RXLEV and RXQUAL signals from the mobile station 30 to derive a quality value for a particular beam. The quality values are input into a store 65 in association with beam A, B, C or D. A quality comparator 66 accesses the data in the store and compares the quality values. The comparison comprises a first comparison of current signal qualities with former values on a beam-by-beam basis. That is to say a current quality of beam A is compared with the last value of the quality of beam A and similarly for beams B and C. A second stage in the comparison compares the current qualities of the individual beams to determine the beam offering the best quality. The results are coupled to a beam scheduler 67 used to derive a number of slots to be allocated to each beam for the next eight allocated slots. The beam scheduler can also perform the function of a designator to designate the beam in use either as a primary or as a secondary beam. These are stored in a store 68. The beam scheduler 67 is also coupled to the beam controller 21.

When a burst of data arrives from a source 69, the beam controller requests that the beam scheduler 67 provide a transmission schedule. The beam scheduler 67 accesses the store 68 and returns to the beam controller 21 the slot schedule for the beams and the packet is transmitted accordingly, via the transmitter sections 22 to 24 and 28.

In the above-described embodiment the quality of the beam is derived from signals transmitted by the mobile station 30 and received by the receiver section 60. The quality determinator 64 processes the received and decoded signals and enters the quality values into store 65. The signals used for this are RXLEV and RXQUAL.

A further embodiment of the invention the apparatus can be described with reference to FIG. 4.

In a SACCH frame during full transmission mode there are 96 speech TDMA frames, four TDMA frames containing the SACCH slots and four blank frames making a total of 104 frames. When the base station transmits in discontinuous transmission mode (DTX) there will be eight speech slots and four SACCH slots. No matter how much or how little voice data needs to be transmitted during DTX mode, the eight speech frames are always used as set by the standard. The mobile station 30, in accordance with the standard, does not concern itself with whether the base station is in full or DTX mode. It is configured to provide two sets of parameters. A first set of parameters in respect of the full mode transmission and a second set of parameters in respect of the DTX mode, but it is important to note that both sets are provided whether or not the base-station is in DTX mode or not. The two sets of parameters are RXLEV_FULL, RXQUAL_FULL and RXLEV_SUB, RXQUAL_SUB.

The second embodiment of the invention results in an unforeseen synergistic effect by combining techniques set out in the standards with a beam dithering technique. When operating in full mode the base station is configured to switch beams during the slots from which the second set of parameters RXLEV_SUB and RXQUAL_SUB are derived. Thus, during one SACCH frame, two beams may be tested. The first set of parameters will be influenced by the signals on the second beam, but this is accommodated by a weighting scheme and processing of the values. The two beams are thus interleaved over a short duration with a common power level offering significant advantages. Automatic transmit power control is operable within GSM to allow changes in the transmitted power from one SACCH frame to another. However, power changes may not take place within a SACCH frame. Thus, performing the comparison between the use of a single beam during the full period with a mix of beams in the sub period, within a SACCH frame, avoids any possible errors which arise due to confusion over whether the performance changed from one frame to another was because of a change in transmitted power from one SACCH frame to the next, or due to a change in the preferred transmitter beam for the base transceiver station. Keeping the measurements within a single SACCH frame avoids this possible confusion. The processing is carried out by the quality determinator 64 to derive the quality values to be stored in the store 65.

To determine the measurement for the TDMA frames which are inside the FULL period and not inside the SUB period denoted as RXLEV_FULL_PURGE the following relationship is used:

$$\text{RXLEV FULL\_PURGE} = (\text{RXLEV\_FULL} \times 100 - \text{RXLEV\_sub} \times 12)/88.$$

Accordingly, an operation constrained by the standard is advantageously used to provide the measures required to determine the best beam to use.

In the event that the base station 30 enters DTX mode, quality determination can be paused until full mode is again entered.

A further advantage of this approach is that the effect of dithering to the alternative beam, which will normally be deleterious to performance, will typically be limited to one interleaving block per SACCH period. Suppose that the block error rate on the primary beam is 0.5%. Suppose, further, that switching to the secondary beam for $\frac{1}{8}^{th}$ of the time degrades the block error rate to 5% (an assumption that is likely to be pessimistic). For the traffic channel without DTX there are 12 blocks per SACCH period. Only one of these will be degraded. Thus, the overall degradation is from 0.5% to $(11 \times 0.5 + 1 \times 5)/12 = 0.875\%$, which is often acceptable. Moreover the proportion of timeslots on the alternative beam can be increased substantially for better discrimination.

In a further enhancement of the invention the feedback channel can assist in the selection of the best beam. However, for much of the time the best beam will be the same as that selected for the uplink. However, the feedback provides for a further benefit which may not be possible without it, namely co-polar matching. Either in addition to, or instead of, the beam dithering, during the RXQUAL_SUB/RXLEV_SUB time slots, the transmit polarisation is set to the opposite of that used in the remaining time slots. The same signaling as described before can be used to allow measurements to determine whether the performance is better or worse on the alternative polarisation. In the steady state, assuming that the equipment has selected a preferred polarisation, then a state is illustrated below in its general form:

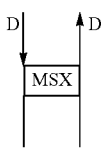

where M denotes the current preferred beam; S denotes the alternative beam that was last evaluated by dithered beam transmission; X denotes the number of frames per 8 frame interleaving block last diverted to the alternative beam; and D denotes the decisions concerning which beam signal is stronger, which determine the transitions. Whenever a switch in polarisation results in a performance improvement, perhaps after averaging over several SACCH periods, then the BTS can switch over from the preferred polarisation.

Figure 5:
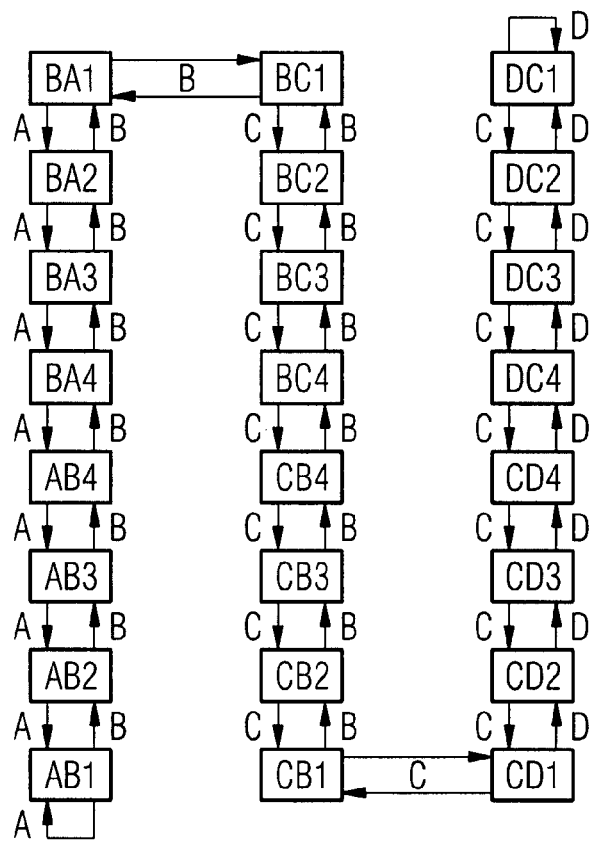
FIG. 5 is a state transition diagram showing change in states between beams A to D in a simulation of the invention.

FIG. 5 shows a state transition diagram showing the change in states between four beams A to D in a simulation. Experimentation with simulations has led to the generation of an efficient algorithm for selection of the best beam with minimal lost signal due to delays in selecting the best beam.

In FIG. 5, the four ordered beams are labeled, A, B, C and D. Suppose, for example, that the system is currently in state BA1. This means that B is the current beam, The last partial measurement on an alternative beam was on beam A and this was performed with 1 frame (on the applicable time slot) of 8, diverted to beam A BA4. The decision can be either B or A as the stronger beam. If B was the stronger beam then we turn to examining the alternative beam on the other side (beam C) so the state becomes BC1. On the other hand, if A was the stronger, we spend a little longer (2 frames out 8 diverted to beam A) looking at beam A. Thus, the state becomes BA2. Suppose that A continues to be stronger than B. We get to 4 frames out of 8 on the alternative beam (A). After this point, if A is still stronger than B, then A becomes the current beam and B becomes the alternative beam.

A simulation was set up with a mobile crossing the four beams in a circular arc at constant speed. The parameters were as follows:

| Parameter | Value |
|---|---|
| Channel | Typical Urban |
| Frequency | 5 Frequencies/ |
| Hopping | Random |
| Speed | 10 mph |
| Time to Cross 120° | 400 seconds |

Figure 6:
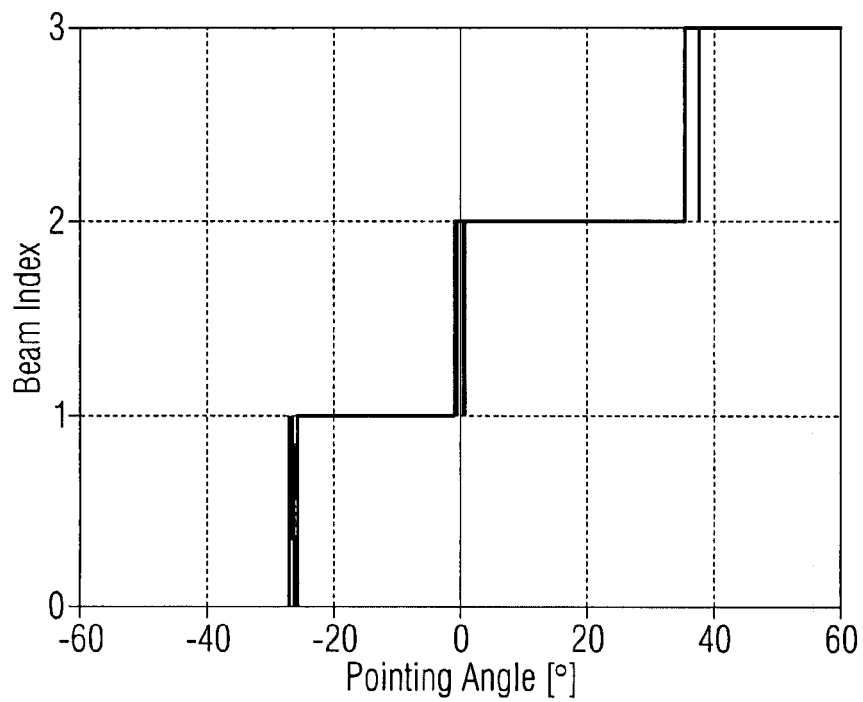
FIG. 6 illustrates change in beam index with pointing angle in a simulation of the invention.
Figure 7:
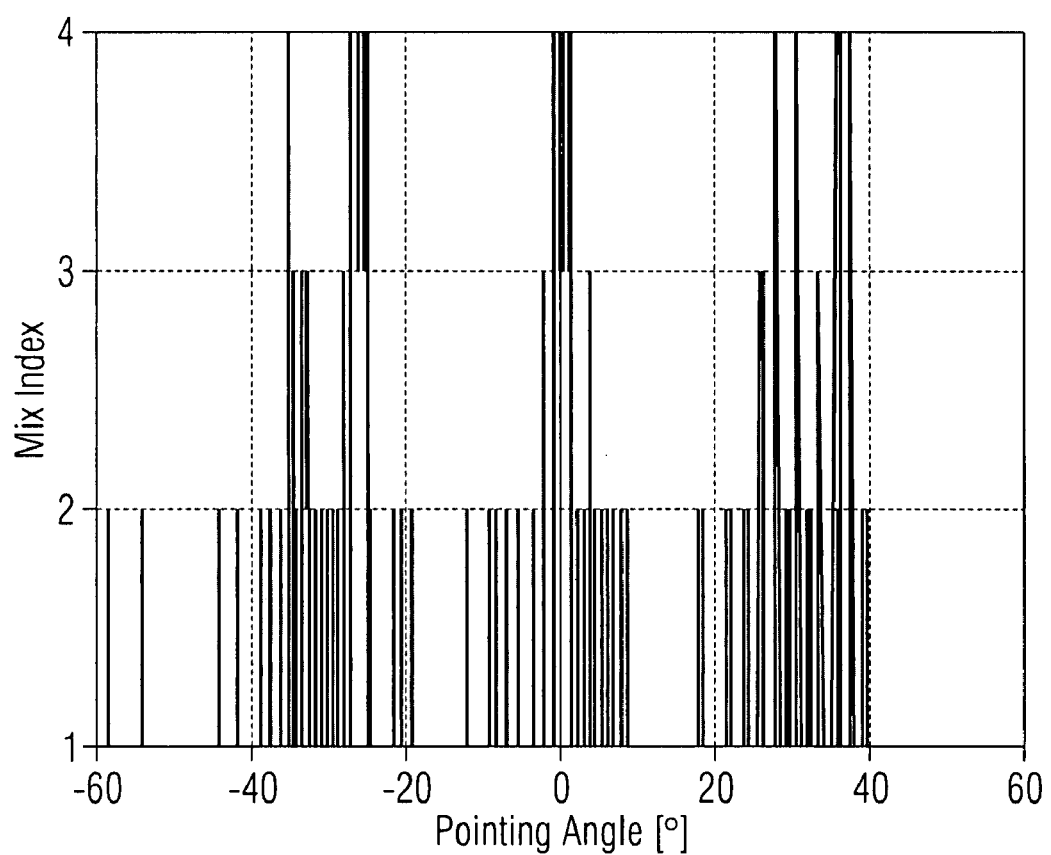
FIG. 7 shows change in mix index with pointing angle in a simulation of the invention.

FIG. 6 shows the results of a beam selection for a single run plotting beam index, i.e. beam 0 is equivalent to A, beam 1 equivalent to B and so on; against pointing angle, that is the angle of the mobile relative to a perpendicular bisector of the set of antennas. Given a set of four beams, in a 120° arc, switching would be expected to occur at 30° intervals. However, there is a delay in beam switching which can be seen for beam 0 to be a little after the expected point, so around −27°, rather than −30°. By chance around 0° this delay happens to be zero. Operation can be better understood by examining the count of the split between the current and alternative beams as seen in FIG. 7, where the value X is plotted against pointing angle. X briefly reaches 4 when passing from one beam to the next. However, random noise effects make this process non-deterministic.

In normal operation, when the current beam is stable, only one frame in eight will use the alternative beam during the RXQUAL_SUB/RXLEV_SUB period. However, because of fading, a switch to two frames in eight is relatively frequent. Because the proportion of the time on two frames is lower than that on one frame and because of the increased bias in the signal towards the preferred beam, the random switches to three frames are relatively infrequent. Only when the beams are close to (and slightly beyond) the crossover point will the mix switch consistently towards 3 or 4 frames out of eight on the alternative beam. Thus the algorithm provides a robust mechanism for switching beam.

There will always be a loss of signal power associated with connection to the inferior beam. This increases with the delay in switching to the correct beam. This effect was examined by comparing the average received power for the selected beam against the power which would have been received if the best beam has always been used resulting in average loss of signal, as a function of pointing angle. The results are shown for an average over 100 runs in FIG. 7.

Here the effect can be clearly seen. In any given run, the loss at a particular angle can be significantly larger (up to 5 dB). The averaging smoothes the effect out so that the peak loss is lower, but spread over a wider angle than would be seen in an individual run.

The loss is caused by the fact that it takes 4 cumulative favourable measurements in the direction of the new beam before beam switching happens. If the mobile is moving at relatively high angular velocity, the delay implied by this leads to significant loss of signal power through the time spent connected to the inferior beam.

A refinement has been generated which sometimes leads to a reduction in this signal power loss. Normally the diversion to the alternative beam is confined to the '_SUB' frames. This allows discrimination of the alternative beam with minimal loss of signal when the wanted signal is inside the current beam. However, when the wanted signal falls near the border between beams, the delay in switching to the correct beam can result in significant loss of signal strength.

Figure 8:
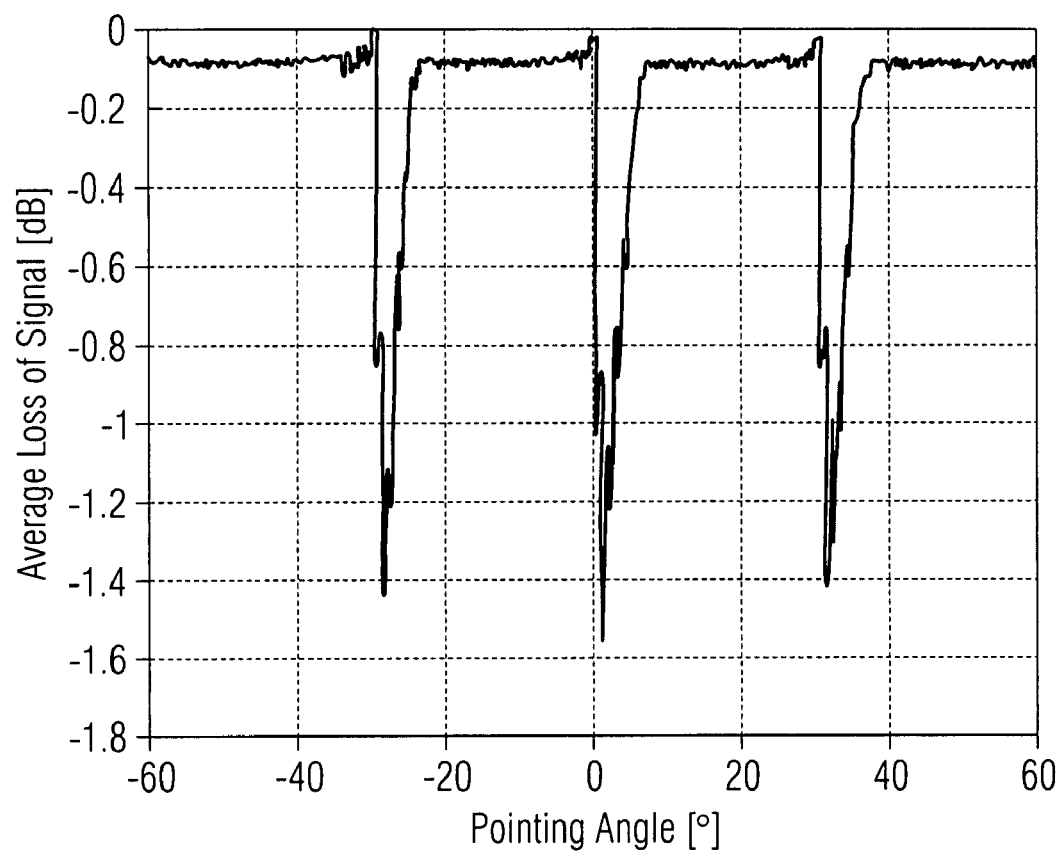
FIG. 8 illustrates a first simulation of change in average loss of signal with pointing angle in a simulation of the invention.
Figure 9:
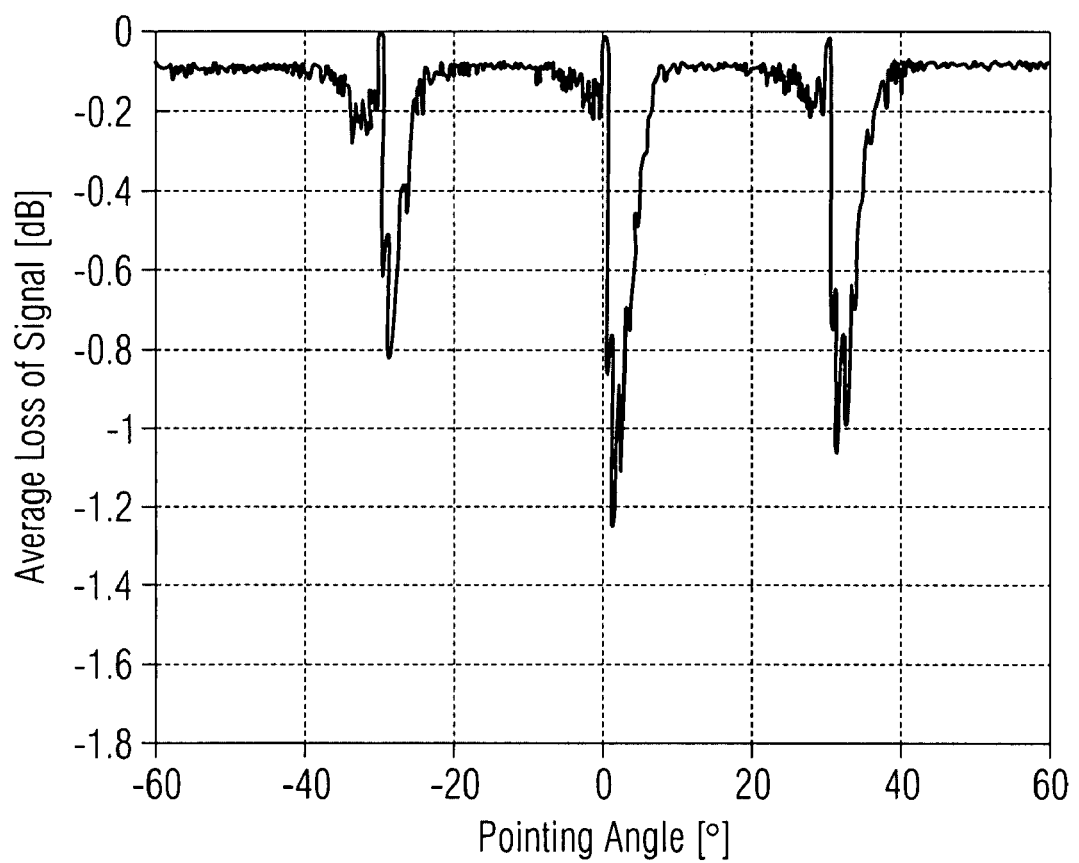
FIG. 9 illustrates a second simulation of change in average loss of signal with pointing angle in a simulation of the invention.

It has been found that this can sometimes be ameliorated by swapping the roles of the RXQUAL_FULL/RXLEV_FULL and the RXQUAL_SUB/RXLEV_SUB frames. Instead of switching between beams during the RXQUAL_SUB/RXLEV_SUB frames, at this time, switching is done between the beams during the RXQUAL_FULL/RXLEV_FULL_frames. This is done whenever the number of frames switched is 3 or 4, i.e. whenever there is a significant split between the frames on the two beams, implying that the mobile is in the border region. Results for this are shown in FIGS. 8 and 9.

The closer the mobile is to the BTS site, the faster the mobile crosses the beams. However, because the path is short, the transmit power is lower, so that the effect on inter-cell interference of using an inferior beam is quite modest. Additionally, the faster the mobile is travelling when crossing a beam, the greater the temporal diversity over fading. This reduces the effect of switching to the wrong beam due to fading.

Although in the described embodiments there is one receiver antenna. More than one antenna can be used and beam-forming techniques can be used.

In another embodiment of the present invention, a W-CDMA system is used, rather than GSM. In this case power control based on the existing transmit power control (TPC) bits that are sent from the user equipment (UE) to the NodeB can be used. In a burst period of 10 ms, with 15 timeslots, the base station receives power control bits, which are differential, indicating whether or not the signal level at the UE is above a threshold. These are used to control the power transmitted from the NodeB to the UE. Thus, a power control bit indicating that the signal level at the UE was below the threshold would result in the NodeB increasing its transmitted power to that UE by a nominal amount, say 1 decibel and vice versa.

The presence of the TPC bits and the functionality of the NodeB in responding to the TPC bits lead to rapid closed loop transmit power control. The power transmitted by a NodeB to a specific UE is controlled directly by the signaling of TPC bits from that UE. Changes in path loss in the downlink from the NodeB to the UE are directly reflected in changes in the NodeB transmitted power.

Thus the downlink beam selection procedure described above can be implemented for W-CDMA by varying the proportions of transmitted energy to a UE on different beams and using the measured changes in NodeB transmitted power to direct the selection of the beams to favour the more optimum beams for most of the time This may be implemented in a number of different ways.

Firstly, the NodeB can switch its beam from the currently preferred beam to an auxiliary beam for a small proportion of the time and the average transmitted powers over the periods compared. In this way the proportions of time spent transmitting using the various beams can be varied, for example, according to the state transition diagram of FIG. 5.

There is a problem with this approach in that an instantaneous switching from one beam to another will lead to a discontinuity in phase and amplitude for the various multi-path components of the signal. The W-CDMA standard specifies the regular transmission of pilot symbols that are used to estimate the radio propagation channel. The channel parameters that apply at times between the pilot symbols are obtained by interpolation. Usually the interpolator works over more than two pilot symbols so that old pilot symbols contribute to new channel estimates. Thus, the channel estimates relating to the point of switching beams will be derived from an inter-mix of pilot symbols, some applying to signals transmitted before the beam switch and some applying to signals transmitted after the beam switch. In general the estimates will be substantially inaccurate over a period of time related to the averaging window employed by the channel estimator. This will typically result in a burst with a high proportion of symbol errors.

Figure 10:
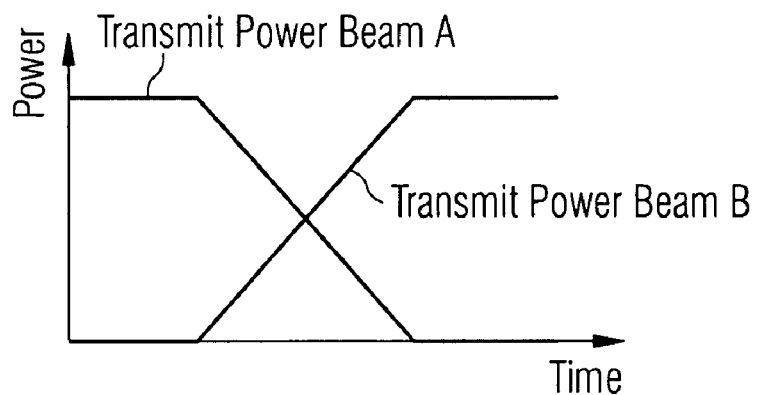
FIG. 10 illustrates linear power ramping for switching beams in a method of the present invention.
Figure 11:
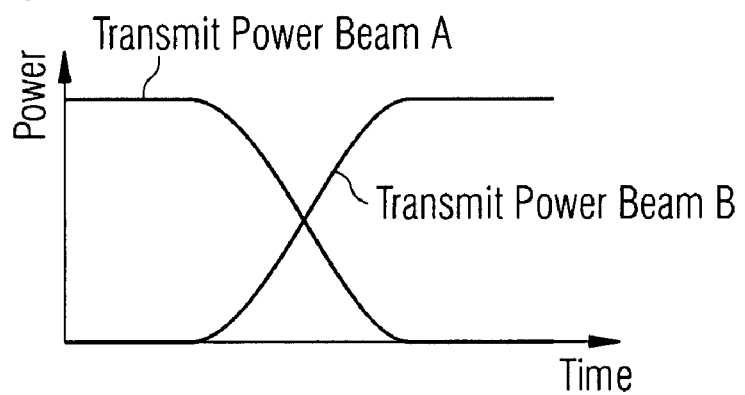
FIG. 11 illustrates raised cosine power ramping for switching beams in a method of the present invention; and, FIG. 12 illustrates linear power ramping with partial mixing for switching beams in a method of the present invention.

This problem can be overcome by removing the instantaneous beam switching. The beams can be switched smoothly using a linear ramp or a raised cosine function as illustrated in FIGS. 10 and 11 respectively. Alternatively the ramping can be performed according to any suitable smooth function and its complement.

Figure 12:
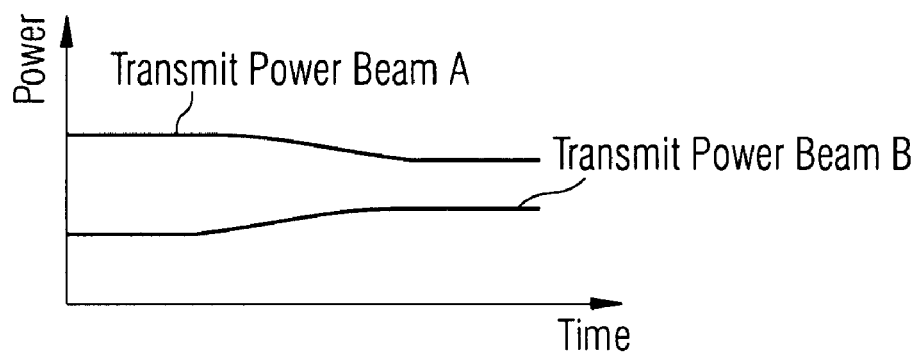

There may be some merit in transmitting on a combination of beams contemporaneously. The weighting of powers used on the two or more beams should ideally be set to lead to a minimum in the overall transmitted power. For this case, also, it will be necessary to vary the inter-mix in order to track changes in the optimum beam combination. A typical change is illustrated in FIG. 12

In this example we see that beam A is initially transmitting more power than beam B. After a smooth transition this situation is unaltered except that the difference between the two powers has reduced whilst the total transmitted power remains the same. Partial combining will work better if the different beams have calibrated phase shifts in their cabling so that the paths can combine coherently. If we consider coherent combining, then the ramping functions need to be altered to ensure constant power through the transition into the final state.

In the case of partial intermix, the alterations in the relative power split can be made relatively small, e.g. a few percent. In this case the overall penalty in efficiency from using a non optimal mix is then also small. Because of this, when the intermixing is done in this way, the first mode of mixing with frames with a primary beam only and the second mode of mixing with frames with a mixture of primary and secondary beams can be considered as identical so that the system hunts between the two modes, spending equal time in each mode. For example, if the mix is varied in steps of 10% of the total power, then a nominal period is spent with one mix, e.g. 70% of the power transmitted on beam A and 30% of the power transmitted on beam B. This is followed by a further period of the same duration with, for example 60% of the power transmitted on beam A and 40% of the power transmitted on beam B. If feedback power control based on the TPC bits causes the transmitted power in the second nominal period to be lower than the transmitted power in the first nominal period, this implies that the path has improved as result of the change in the mix. Given this, the mix for the next period is altered to 50% of the power transmitted on both beams.

The invention claimed is:
1. A method of maintaining a communications link between a network node and a mobile node of a communications network, the method comprising
providing at least two downlink transmission beams;
designating a first of the at least two beams as a primary transmission beam;
using the beams in accordance with a schedule;
taking received signal quality or signal strength measurements at the mobile node;
signaling the measurements to the network node;
determining a quality of link on the primary transmission beam and at least one other of the at least two transmission beams from the measurements signaled from the mobile node to the network node;
comparing the quality of link for the beams to provide a comparison and varying the schedule in accordance with the comparison;
wherein the network node is operable in a full mode and a discontinuous mode; and
wherein the beams are tested and switched by the network node in a global system for mobile communication GSM operation within the duration of a slot in a single slow associated control channel SACCH frame of a GSM transmission frame.

2. A method according to claim 1, wherein the comparison comprises comparing a current quality of a link on a beam with a former quality of the link on that beam.

3. A method according to claim 1 wherein the comparison comprises comparing the quality of a link on a first beam and the quality of a link on a second beam or on an intermix between the first beam and said second beam.

4. A method according to claim 3, wherein the beam designated as the primary beam as a result of the comparison has a greater scheduled use.

5. A method according to claim 4, wherein when the comparison result indicates a higher quality link on a beam that beam is made the primary beam.

6. A method according to claim 5, wherein the former primary beam is made a secondary beam.

7. A method according to claim 1, wherein the schedule is varied to increase the use of a beam in the case of the comparison indicating an increase in the quality of the link on that beam.

8. A method according to claim 1, wherein the quality of a beam is determined at the network node based on a signal or signals received from the mobile node, wherein the signal or signals relate to a transmission on a first beam received by the mobile station during a first transmission channel and to a transmission on a second beam, or an intermix of the first and second beams, received by the mobile node on a second channel.

9. A method according to claim 8, wherein the channels are configured in a communications frame in a global system for mobile communications (GSM) communication system including a slow associated control channel.

10. A method according to claim 1, in which the schedule of use includes a switch in the polarization of at least one of the beams.

11. A method according to claim 1, wherein the schedule of use switches beams during at least one of a first and a second set of slots allocated for the derivation of RXQUAL_SUB/RXLEV_SUB and RXQUAL_FULL/RXLEV_FULL.

12. A method according to claim 11, wherein the schedule of use switches beams in the set of slots allocated for the derivation of RXQUAL_SUB/RXLEV_SUB.

13. A method according to claim 11, wherein the first transmission beam is utilized for substantially all of the slots allocated to the derivation of RXQUAL_FULL/RXLEV_FULL.

14. A method according to claim 12, wherein the second transmission beam is utilized for a proportion up to all of the slots allocated for the derivation of RXQUAL_SUB/RXLEV_SUB and not utilized for any of the slots allocated for the derivation of RXQUAL_FULL/RXLEV_FULL.

15. A method according to claim 1, wherein the schedule is varied by varying the number of respective slots allocated to the respective transmission beams.

16. A method according to claim 15, wherein the schedule of use of slots allocated for the derivation of RXQUAL_SUB/RXLEV_SUB by the transmission beams is varied incrementally.

17. A method according to claim 11, wherein
when switching between beams, the primary beam switches from an old primary beam to a new primary beam and, when previous measurements indicate that the correct usage of beams is borderline between two adjacent beams, the switching between beams during a SACCH frame is performed during time division multiple access (TDMA) frames allocated for the derivation of RXQUAL_FULL/RXLEV_FULL measurements and the old primary beam is used during TDMA frames allocated for the derivation RXQUAL_SUB/RXLEV_SUB measurements.

18. A method according to claim 1, wherein signal strength measurements are signaled using transmit power control bits and mean transmitted power over multiple frames is determined by the network node to determine the primary transmitted beam.

19. A method according to claim 18, wherein smooth switching from a first beam as primary transmission beam to a second beam as primary transmission beam is applied.

20. A method according to claim 19, wherein the smooth switching comprises one of linear power ramping; raised cosine power ramping and linear power ramping with partial mixing.

21. A method according to claim 20, wherein, for linear power ramping with partial mixing, changes in relative power difference are minimized.

22. An apparatus for maintaining a communications link between a network node and a mobile node of a communications network, the apparatus comprising
a beam controller to provide at least two downlink transmission beams;
a designator to designate a first of the at least two beams as a primary transmission beam;
a scheduler to provide a schedule for the use of the beams;
a receiver in the mobile node to measure received signal quality or signal strength and to signal the measurements to the network node;
a quality determinator to determine a quality of the primary beam and at least one other of the at least two transmission beams from the measurements signaled from the mobile node to the network node; and
a comparator to compare the quality of the link for the beams to provide a comparison result;
wherein the scheduler is responsive to the comparison to vary the schedule;
wherein the beam is switched during full or discontinuous mode transmission modes; and wherein, in global system for mobile communication GSM operation, the beams to be tested are switched by the network node within the duration of a slot in a single slow associated control channel SACCH frame of a GSM transmission frame.

23. Apparatus according to claim 22, wherein the comparator compares a current quality of a link on a beam with a former quality of the link on that beam.

24. Apparatus according to claim 22, wherein the comparator compares the quality of the link on a first and a second beam.

25. Apparatus according to any of claims 22, wherein the designator is responsive to the comparator to designate the beam having the highest quality as the primary beam.

26. Apparatus according to claim 25, wherein the designator is responsive to the comparator to designate the beam formerly having the highest quality as the secondary beam.

27. Apparatus according to claim 22, wherein a base station transceiver transmits using a first beam during the time slots from the set of TDMA frames allocated for the derivation of RXQUAL_FULL/RXLEV_FULL and wherein during the time slots from the set of TDMA frames allocated for the derivation of RXQUAL_SUB/RXLEV_SUB the base station transceiver transmits during a proportion of those TDMA frames using the first beam and a complementary proportion of those TDMA frames using a second beam wherein the proportion may vary from zero to one hundred percent.

28. Apparatus according to claim 22, wherein
when switching between beams, the primary beam switches from an old primary beam to a new primary beam and, when previous measurements indicate that the correct usage of beams is borderline between two adjacent beams, a base station transceiver switches between beams during a SACCH frame performed during the TDMA frames allocated for the derivation of RXQUAL_FULL/RXLEV_FULL measurements and the old primary beam is used during the TDMA frames allocated for the derivation RXQUAL_SUB/RXLEV_SUB measurements.

29. Apparatus according to claim 22, wherein the communications network comprises one of GSM and 3G.

* * * * *

UNITED STATES PATENT AND TRADEMARK OFFICE
CERTIFICATE OF CORRECTION

PATENT NO. : 8,094,572 B2  
APPLICATION NO. : 11/666075  
DATED : January 10, 2012  
INVENTOR(S) : Anthony Peter Hulbert Page 1 of 1

It is certified that error appears in the above-identified patent and that said Letters Patent is hereby corrected as shown below:

First Page Column 2 (Other Publications), Line 6, Delete "GB042503.2." and insert -- GB0423503.2. --, therefor.

Column 12, Line 8, In Claim 14, delete "claim 12 ," and insert -- claim 12, --, therefor.

Column 12, Line 67, In Claim 22, before "transmission" delete "mode".

Column 13, Line 12, In Claim 25, delete "any of claims" and insert -- claim --, therefor.

Signed and Sealed this
Tenth Day of April, 2012

David J. Kappos
*Director of the United States Patent and Trademark Office*